(12) United States Patent
Odaka et al.

(10) Patent No.: US 6,437,071 B1
(45) Date of Patent: Aug. 20, 2002

(54) SILANE-FUNCTIONALIZED POLYETHER COMPOSITION

(75) Inventors: Hidetoshi Odaka, Takasago; Yuka Kanamori, Akashi; Hiroshi Ito, Takasago; Hideharu Jyono, Kobe; Hiroshi Iwakiri, Kobe; Fumio Kawakubo, Kobe, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/531,337

(22) Filed: Mar. 20, 2000

(30) Foreign Application Priority Data

Mar. 18, 1999 (JP) ............................................. 11-073224

(51) Int. Cl.⁷ ......................... C08G 77/06; C08G 77/60
(52) U.S. Cl. ........................... 528/15; 528/25; 528/901; 528/408; 528/409; 528/410; 524/284; 524/322; 556/479
(58) Field of Search ............................ 528/901, 25, 34, 528/15, 408, 409, 410; 556/479; 524/284, 322

(56) References Cited

U.S. PATENT DOCUMENTS

| | | | |
|---|---|---|---|
| 4,242,466 A | * | 12/1980 | Schilling, Jr. et al. |
| 4,965,311 A | * | 10/1990 | Hirose et al. |
| 5,063,270 A | * | 11/1991 | Yukimoto et al. |
| 5,223,583 A | * | 6/1993 | Higuchi et al. |

FOREIGN PATENT DOCUMENTS

| | | |
|---|---|---|
| EP | 0 397 036 A2 | 11/1990 |
| EP | 0 532 049 A1 | 3/1993 |
| EP | 0 584 978 A1 | 3/1994 |
| EP | 0 829 504 A1 | 3/1998 |
| EP | 0 844 266 A2 | 5/1998 |
| JP | 09296046 | 11/1997 |
| WO | WO00/40654 | 7/2000 |

OTHER PUBLICATIONS

Contemporary Polymer Chemistry, 2nd edition, Allcock et al., Prentice Hall, Inc. (c) 1990, p. 2.*

* cited by examiner

*Primary Examiner*—Robert Dawson
*Assistant Examiner*—Marc Zimmer
(74) *Attorney, Agent, or Firm*—Connolly Bove Lodge & Hutz LLP

(57) ABSTRACT

The present invention has its object to provide a curable composition giving cured products improved in residual tack (reduced in stickiness), with the physical properties insuring those tensile characteristics and rubber elasticity required of sealing compositions for general architectural use being retained. The present invention provides a curable composition which comprises (I) 100 parts by weight of a reactive silicon group-containing polyether oligomer with the percentage of the number of reactive silicon groups to the number of molecular chain terminals as determined by $^1$H-NMR analysis being not less than 85% and (II) 1 to 500 parts by weight of a plasticizer.

28 Claims, No Drawings

SILANE-FUNCTIONALIZED POLYETHER COMPOSITION

FIELD OF THE INVENTION

The present invention relates to a curable composition comprising a reactive silicon group-containing polyether oligomer and a plasticizer.

BACKGROUND OF THE INVENTION

Room temperature curing compositions based on a polyether having at least one reactive silicon group per molecule can be utilized, for example, as sealants for architectural and other applications. They are inexpensive and have good performance characteristics. It is desired that they show a proper rate of cure on the occasion of curing. It is also desired that the resulting rubber-like cured products have nonstick surfaces and, as regards tensile characteristics, high elongation and rubber elasticity with good flexibility.

Plasticizers are generally added to room temperature curing compositions not only for the purpose of improving the tensile characteristics which are required of them but also in view of advantages in terms of cost and workability, among others. Some compositions of this type fail to give fully cured products due to formulations thereof and/or curing conditions, so that the product appearance is deteriorated by adhesion of dust and the like due to the residual tack (stickiness) of the cured product surface. Improvements have thus been required.

The present applicant has already proposed, in Japanese Kokai Publication Sho-61-34066 and Japanese Kokai Publication Sho-61-34067, a simple method of producing improvements in the modulus, elongation characteristics and residual tack (stickiness) of a reactive silicon group-containing rubber type organic polymer, which comprises adding a monovalent silanol compound or a derivative thereof.

While the tensile characteristics of such cured products can be improved by the above method, there is still room for improvement with respect to the residual tack (stickiness).

SUMMARY OF THE INVENTION

Accordingly, it is an object of the present invention to provide a curable composition giving cured products improved in residual tack (reduced in stickiness), with the physical properties insuring those tensile characteristics and rubber elasticity required of sealing compositions for general architectural use being retained.

Thus, the present invention provides a curable composition which comprises (I) 100 parts by weight of a reactive silicon group-containing polyether oligomer with the percentage of the number of reactive silicon groups to the number of molecular chain terminals as determined by $^1$H-NMR analysis being not less than 85% and (II) 1 to 500 parts by weight of a plasticizer.

DETAILED DESCRIPTION OF THE INVENTION

Hereinafter, the present invention is described in detail.

The reactive silicon group-containing polyether oligomer (I) to be used in the curable composition of the present invention has a percentage of the number of reactive silicon groups to the number of molecular chain terminals as determined by $^1$H-NMR analysis which is not less than 85%.

The reactive silicon group as so referred to herein has at least one hydroxyl group and/or hydrolyzable group bound to a silicon atom and capable of being crosslinked by a mutual condensation reaction to form a siloxane bond. While the above group is not particularly restricted, those groups which are represented by the general formula (1) shown below, for instance, may be mentioned as particularly preferred ones:

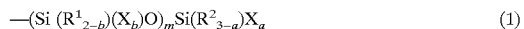

$$—(Si\ (R^1{}_{2-b})(X_b)O)_m Si(R^2{}_{3-a})X_a \qquad (1)$$

wherein, $R^1$ and $R^2$ are the same or different and each represents an alkyl group containing 1 to 20 carbon atoms, an aryl group containing 6 to 20 carbon atoms, an aralkyl group containing 7 to 20 carbon atoms or a triorganosiloxy group of the formula $(R')_3SiO—$, in which the three $R'$ groups are the same or different and each is a monovalent hydrocarbon group containing 1 to 20 carbon atoms, and when there are two or more $R^1$ or $R^2$ groups, they may be the same or different; X represents a hydroxyl group or a hydrolyzable group and, when there are two or more X groups, they may be the same or different; a represents 0, 1, 2 or 3, b represents 0, 1 or 2 and the b's in the m-Si($R^1{}_{2-b}$)($X_b$)—O— groups may be the same or different; m represents an integer of 0 to 19; with the condition that the relation of a +Σb≧1 is satisfied.

As specific examples of $R^1$ and $R^2$ in the above general formula (1), there may be mentioned, among others, alkyl groups such as methyl and ethyl, cycloalkyl groups such as cyclohexyl, aryl groups such as phenyl, aralkyl groups such as benzyl, and triorganosiloxy groups represented by $(R')_aSiO—$ in which R' is, for example, methyl or phenyl. Among them, methyl is particularly preferred as $R^1$, $R^2$ and R'.

Among the groups represented by X, the hydrolyzable group is not particularly restricted but may be any known hydrolyzable group. Specifically, there may be mentioned a hydrogen atom, halogen atoms, alkoxy groups, acyloxy groups, ketoximate groups, amino groups, amido groups, acid amide groups, aminooxy groups, mercapto groups, alkenyloxy groups and the like. Among these, alkoxy groups such as methoxy, ethoxy, propoxy and isopropoxy are preferred because of their mild hydrolyzability and ease of handling.

One to three hydroxyl groups and/or hydrolyzable groups may be bound to one silicon atom and the sum (a+Σb) is preferably 1 to 5. When two or more hydroxyl and/or hydrolyzable groups occur in the reactive silicon group, they may be the same or different.

The number of silicon atoms in the reactive silicon group may be one or two or more. In cases where the reactive silicon group involves silicon atoms joined together via siloxane bonding or the like, the number of silicon atoms may be up to about 20.

Preferred because of their ready availability are those reactive silicon groups represented by the general formula (8):

$$—Si(R^2{}_{3-a})Xa \qquad (8)$$

wherein $R^2$, X and a are as defined above in relation to the general formula (1).

The above reactive silicon group may occur as a side chain internally within the polyether molecule chain or at a terminal thereof. For use as sealants or the like for buildings and the like, it is particularly preferred that said group occur at a terminal of said chain. When the reactive silicon group occurs as an internal side chain, the effective size of network bonding of the polyether oligomer component contained in the cured product finally formed becomes small, hence the product tends to become a rubber-like one showing high elasticity modulus and low elongation. On the contrary, when the reactive silicon group occurs in the vicinity of a molecular chain terminal, the effective size of network bonding of the polyether oligomer component contained in the cured product finally formed becomes large, hence the product tends to become a rubber-like one showing high strength, high elongation and low elasticity modulus. Particularly when the reactive silicon group occurs at a terminal of the molecular chain, the effective size of network bonding of the polyether oligomer component contained in the cured product finally formed becomes maximum, and this is particularly favorable for sealant or like use for buildings where rubber elasticity with high elongation characteristics as tensile characteristics and with rich flexibility is desired.

While various methods are conceivable for the measurement of the percentage of introduction of such reactive silicon group, said percentage is determined, in the practice of the present invention, by $^1$H-NMR analysis of the reactive silicon group-containing polyether oligomer (I). Thus, the reactive silicon group introduction percentage can be calculated by determining the proportion of the number of reactive silicon groups to the number of molecular chain terminals of polyether oligomer as determined by $^1$H-NMR analysis.

From the viewpoint of curability alone of the curable composition, it is sufficient if the number of reactive silicon groups is not less than 50% of the number of polyether oligomer terminals. For achieving improvements in residual tack (stickiness), however, it is necessary that the above number be not less than 85%. For achieving further improvements, the above number is preferably not less than 90%, more preferably not less than 95%, most preferably not less than 98%. A curable composition containing such polyether oligomer can give cured products having tensile characteristics and rubber elasticity of that level which is required of sealing compositions for general architectural use and, at the same time, improved in residual tack and having lower stickiness, as compared with the prior art ones. When the above percentage value is less than 85%, the stickiness reducing effect is relatively weak. Such relationship between the reactive silicon group introduction percentage and the residual tack is not known in the prior art but has been revealed for the first time by the present inventors.

The main chain structure of the reactive silyl group-containing polyether oligomer (I) may comprise a structure represented by —R—O— as a repeating unit in which R may be a divalent organic group containing 1 to 20 carbon atoms and one or more constituent atoms selected from the group consisting of hydrogen, oxygen and nitrogen. The above oligomer may be a homopolymer in which all repeating units are the same, or may be a copolymer comprising two or more repeating unit species. Further, the oligomer may have a branched chain structure in the main chain.

Such main chain structure of the reactive silicon group-containing polyether oligomer (I) originates from the main chain structure of a hydroxy-containing polyether oligomer obtained by subjecting one or more substituted and/or unsubstituted epoxy compounds containing 2 to 12 carbon atoms to ring opening polymerization in the presence of any of various catalysts, using an initiator selected from among dihydric alcohols, polyhydric alcohols or various hydroxy-containing oligomers.

The above epoxy compound is not particularly restricted but includes, among others, alkylene oxides, specifically ethylene oxide, propylene oxide, α-butylene oxide, β-butylene oxide, hexene oxide, cyclohexene oxide, styrene oxide, α-methylstyrene oxide, etc.; and alkyl, allyl or aryl glycidyl ethers, specifically methyl glycidyl ether, ethyl glycidyl ether, isopropyl glycidyl ether, butyl glycidyl ether, allyl glycidyl ether, phenyl glycidyl ether and the like. Among them, alkylene oxides are preferred. In particular, it is particularly preferred, from the viewpoint of ready material availability, cost and reaction control, among others, that the main chain structure of the reactive silicon group-containing polyether oligomer (I) be mainly derived from propylene oxide. The expression "mainly derived from propylene oxide" as used herein means that propylene oxide accounts for not less than 50%, preferably not less than 70%, most preferably not less than 90%, of all repeating units constituting the main chain structure.

The above initiator is not particularly restricted but includes, among others, ethylene glycol, propylene glycol, butanediol, hexamethylene glycol, methallyl alcohol, hydrogenated bisphenol A, neopentyl glycol, polybutadiene diol, diethylene glycol, triethylene glycol, polyethylene glycol, polypropylene glycol, polypropylene triol, polypropylene tetraol, dipropylene glycol, glycerol, trimethylolmethane, trimethylolpropane and pentaerythritol.

The catalyst to be used in the above ring opening polymerization includes those catalysts which are already known, for example alkali catalysts such as KOH and NaOH, acidic catalysts such as trifluoroborane etherate, aluminoporphyrin metal complexes and double metal cyanide complex catalysts such as cobalt zinc cyanide-glyme complex catalysts. Particularly when double metal cyanide complex catalysts are used, the content of the byproduct allyl-terminated polyether oligomer component is low, so that, in the step of introducing an unsaturated group other than allyl, the rate of introduction of said unsaturated group other than allyl can favorably be improved.

It is particularly preferred that the main chain structure of the reactive silicon group-containing polyether oligomer (I) is derived from a polyether oligomer obtainable by ring opening addition polymerization of an alkylene oxide in the presence of double metal cyanide complex catalyst.

The hydroxy-containing polyether oligomer obtained by polymerization may be, or may not be, converted to a higher molecular weight product by reacting with a polyhalogenated compound or the like.

For obtaining the reactive silicon group-containing polyether oligomer (I), there is available, for instance, a method which comprises preparing a hydroxy-containing polyether oligomer by polymerization, then converting the hydroxy groups of said polyether oligomer to certain specific unsaturated groups to give a precursor of the reactive silicon group-containing polyether oligomer (A), and hydrosilylating the resulting terminal unsaturated group.

More specifically, the desired oligomer can be obtained by reacting (a) a polyether oligomer which has a polyether, as its main chain, and at least one, per molecule, of a side chain or terminal unsaturated group represented by the general formula (2):

$$H_2C=C(R^3)-R^4-O- \quad (2)$$

wherein $R^3$ is a hydrocarbon group containing not more than 10 carbon atoms and $R^4$ is a divalent organic group containing 1 to 20 carbon atoms and one or more constituent atoms selected from the group consisting of hydrogen, oxygen and nitrogen atoms, or by the general formula (3):

$$HC(R^3)=CH-R^4-O- \quad (3)$$

wherein $R^3$ is a hydrocarbon group containing not more than 10 carbon atoms and $R^4$ is a divalent organic group containing 1 to 20 carbon atoms and one or more constituent atoms selected from the group consisting of hydrogen, oxygen and nitrogen atoms, with (b) a reactive silicon group-containing compound in the presence of (c) a group VIII transition metal catalyst.

In the prior art, the reaction yield of the hydrosilylation reaction of an unsaturated group and a reactive silicon group-containing compound has its limits when the polyether oligomer has an allyl group as the unsaturated group, since propenyl group formation occurs as a result of a side reaction, namely internal rearrangement, of the allyl group. On the contrary, by introducing a reactive silicon group-containing compound into a polyether oligomer having the unsaturated group representedby the general formula (2) or (3) by hydrosilylation, it is possible to obtain a polyether oligomer with a reactive silicon group introduction rate of not less than 85%. So far, such oligomer has never been obtained.

In the above general formulas (2) and (3), $R^3$ includes, among others, straight-chain alkyl groups such as methyl, ethyl, propyl, butyl, pentyl, hexyl, heptyl, octyl, nonyl and decyl, branched alkyl groups such as isopropyl, isobutyl, isopentyl and isohexyl, and aryl groups such as phenyl, and may comprise a single species or a mixture of a plurality of species. From the reactivity viewpoint, $CH_3$— and $CH_3CH_2$— are particularly preferred and $CH_3$— is most preferred.

$R^4$ is a divalent organic group containing 1 to 20 carbon atoms and one or more constituent atoms selected from the group consisting of hydrogen, oxygen and nitrogen atoms and includes, among others, —$CH_2$—, —$C_2H_4$—, —$C_3H_6$—, —$C_4H_8$—, —$C_5H_{10}$—, —$C_6H_4$—, —$C6H_{12}$—, —$C_7H_{14}$—, —$C_8H_{16}$—, —$C_9H_{18}$—, —$C_{10}H_{20}$—, —$CH(CH_3)$—, —$CH_2$—$CH(CH_3)$—, —$CH_2$—$CH(CH_3)$—$CH_2$—, —$C_2H_4$—$CH(CH_3)$—, —$CH_2$—$C_6H_4$—, —$CH_2$—$C_6H_4$—$CH_2$—, —$C_2H_4$—$C_6H_4$— and the like. Because of ease of synthesis, —$CH_2$—, —$CH_2CH_2$— and —$CH_2CH(CH_3)$— are preferred. Further, because of ready material availability, —$CH_2$— is most preferred.

As specific structures of such unsaturated group, there may be mentioned $H_2C$=$C(CH_3)$—$CH_2$—O—, $H_2C$=$C(CH_2CH_3)$—$CH_2$—O—, $H_2C$=$C(CH_2CH(CH_3))$—$CH_2$—O—, $HC(CH_3)$=$CH$—$CH_2$—O— and the like. In particular, from the reactivity viewpoint, $H_2C$=$C(CH_3)$—$CH_2$—O— and $HC(CH_3)$=$CH$—$CH_2$—O— are preferred and, because of ready material availability and ease of synthesis, $H_2C$=$C(CH_3)$—$CH_2$—O— is most preferred.

For producing the precursor (a) by introducing an unsaturated group into a hydroxy-terminated polyether oligomer obtained by carrying out the ring opening addition polymerization in the above manner, any per se known method can be used. For example, the method comprising reacting the hydroxy-terminated polyether oligomer with an unsaturated bond-containing compound to unite the both by ether bonding, ester bonding, urethane bonding, carbonate bonding or the like may be mentioned. In the case of introduction of unsaturated bond involving ether bonding, for instance, the method may be mentioned which comprises converting the terminal hydroxy group of the polyether oligomer to a metaloxy group —OM (M being Na or K) and then reacting the latter with an organic halide compound represented by the general formula (6):

$$H_2C=C(R^3)\!-\!R^4\!-\!X \tag{6}$$

wherein $R^3$ is a hydrocarbon group containing not more than 10 carbon atoms and $R^4$ is a divalent organic group containing 1 to 20 carbon atoms and one or more constituent atoms selected from the group consisting of hydrogen, oxygen and nitrogen atoms and X is a halogen atom, or by the general formula (7):

$$HC(R^3)=CH\!-\!R^4\!-\!X \tag{7}$$

wherein $R^3$ is a hydrocarbon group containing not more than 10 carbon atoms and $R^4$ is a divalent organic group containing 1 to 20 carbon atoms and one or more constituent atoms selected from the group consisting of hydrogen, oxygen and nitrogen atoms and X is a halogen atom, to give an unsaturated group-terminated polyether oligomer.

As regards the molecular weight of the (a) component polyether oligomer, there is no particular restriction. It preferably has a number average molecular weight of 1,000 to 100,000, however. When the number average molecular weight is less than 1,000, the cured products from the resulting reactive silicon group-containing polyether oligomer will be fragile. When it is in excess of 100,000, the functional group concentration becomes too low and the cure rate lowers and, in addition, the polymer viscosity becomes excessively high, making handling thereof difficult. This is unfavorable. Further, from the viewpoint of the viscosity of the resulting reactive silicon group-containing polyether oligomer, a number average molecular weight of 1,000 to 50,000 is preferred and, for attaining desired mechanical characteristics, one within the range of 5,000 to 50,000 is particularly preferred.

The number average molecular weight of the polyether oligomer as so referred to herein is defined as the number average molecular weight determined by directly measuring the terminal group concentration by titration based on the principles of the hydroxy value determination method according to JIS K 1557 and the iodine value determination method according to JIS K 0070 and taking the structure of the polyether oligomer into consideration. It is also possible to determine the number average molecular weight by a relative measurement method which comprises constructing a working curve for the polystyrene converted molecular weight determined by general GPC measurement and the above terminal group-based molecular weight, and making the conversion from GPC-based molecular weight to terminal group-based molecular weight.

The reactive silicon group-containing compound (b) to be used for the production of the reactive silicon group-containing polyether oligomer (I) may be any compound that has at least one silicon group bound to the above hydroxy and/or hydrolyzable group within the molecule and at least one Si—H group within the molecule. As typical examples, there may be mentioned those compounds which are represented by the general formula (9):

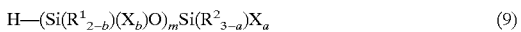
$$H\!-\!(Si(R^1{}_{2-b})(X_b)O)_m Si(R^2{}_{3-a})X_a \tag{9}$$

wherein $R^1$, $R^2$, X, a, b and m are as defined above in relation to the general formula (1).

Specifically, there may be mentioned halogenated silanes such as trichlorosilane, methyldichlorosilane, dimethylchlorosilane, phenyldichlorosilane, trimethylsiloxymethylchlorosilane and 1,1,3,3-tetramethyl-1-bromodisiloxane; alkoxysilanes such as trimethoxysilane, triethoxysilane, methyldiethoxysilane, methyldimethoxysilane, phenyldimethoxysilane, trimethylsiloxymethylmethoxysilane and trimethylsiloxydiethoxysilane; acyloxysilanes such as methyldiacetoxysilane, phenyldiacetoxysilane, triacetoxysilane, trimethylsiloxymethylacetoxysilane and trimethylsiloxydiacetoxysilane; ketoximatesilanes such as bis(dimethylketoximate)

methylsilane, bis(cyclohexylketoximate)methylsilane, bis (diethyl-ketoximate)trimethylsiloxysilane, bis(methylethyl-ketoximate)methylsilane and tris(acetoximate)silane; and alkenyloxysilanes such as methylisopropenyloxysilane. Among them, alkoxysilanes are particularly preferred and, among alkoxy groups, methoxy is most preferred.

Further, in the practice of the present invention, the hydrolyzable group X in the terminal silyl group obtained may be converted to another hydrolyzable group Y. Particularly when the group X is halogen, ahydrogen halide, which has a strong irritant odor, is generated on the occasion of curing, so that conversion thereof to another hydrolyzable group is preferred. As the another hydrolyzable group to which X is convertible, there may be mentioned alkoxy groups, acyloxy groups, ketoximate groups, amido groups, acid amido groups, aminooxy groups and mercapto groups, among others.

Various methods may be mentioned for converting the halogen functional group to such hydrolyzable functional groups.

For converting to an alkoxy group, there may be specifically mentioned the method comprising reacting the halogen functional group with (1) an alcohol or phenol, such as methanol, ethanol, 2-methoxyethanol, sec-butanol, tert-butanol or phenol, (2) an alkoxide derived from an alcohol or phenol and sodium, potassium, lithium or the like, (3) an orthoformate ester, such as methyl orthoformate or ethyl orthoformate, or (4) an epoxy compound, such as ethylene oxide, propylene oxide or allyl glycidyl ether, for instance. Particularly when a reaction system comprising the combination of (1) and (3), namely using an alcohol or phenol and an orthoformate ester or a reaction system comprising the combination of (1) and (4), namely using an alcohol or phenol and an epoxy compound is used, the reaction can be carried out with ease and favorable results can be obtained.

Similarly, for converting to an acyloxy group, there may be specifically mentioned the method comprising reacting the halogen functional group with (1) a carboxylic acid such as acetic acid or propionic acid, (2) an acid anhydride such as acetic anhydride or (3) the sodium, potassium or lithium salt of a carboxylic acid, for instance.

Similarly, for converting to an aminooxy group, there may be specifically mentioned the method comprising reacting the halogen functional group with (1) a hydroxylamine such as N,N-dimethylhydroxylamine, N, N-diethylhydroxylamine, N,N-methylphenylhydroxylamine or N-hydroxypyrrolidine or (2) the sodium, potassium or lithium salt of a hydroxylamine, for instance.

Similarly, for converting to an amido group, there may be specifically mentioned the method comprising reacting the halogen functional group with (1) a primary or secondary amine such as N,N-dimethylamine, N,N-diethylamine, N-methylphenylamine or pyrrolidine or (2) the sodium, potassium or lithium salt of a primary or secondary amine, for instance.

Similarly, for converting to an acid amido group, there may be specifically mentioned the method comprising reacting the halogen functional group with (1) an acid amide having at least one hydrogen atom on the nitrogen atom thereof, such as acetamide, formamide or propionamide or (2) the sodium, potassium or lithium salt of such an acid amide, for instance.

By using a reaction system in which a ketoxime such as acetoxime or methyl ethyl ketoxime or a mercaptan such as n-octylmercaptan or tert-butylmercaptan is used combinedly with an orthoformate ester or an epoxy compound, it is possible to effect partial conversion to the ketoximate group or mercapto group, respectively, while the remaining portion can be converted to the alkoxy group derived from the orthoformate ester or epoxy compound.

The technique of conversion to another hydrolyzable functional group can be applied not only to the above-mentioned case of halogen functional group but also to various hydrolyzable functional groups for converting them to other hydrolyzable functional groups.

As regards the group VIII transition metal catalyst (c) to be used in the production of the reactive silicon group-containing polyether oligomer (I), metal complex catalysts comprising a metal selected from among the group VIII transition metal elements such as platinum, rhodium, cobalt, palladium and nickel can effectively be used. For example, $H_2PtCl_6 \cdot 6H_2O$, platinum-vinylsiloxane complexes, platinum-olefin complexes, Pt metal, $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$ and the like compounds canbe used. From the viewpoint of reactivity in hydrosilylation, however, the use of one of the platinum-vinylsiloxane complexes and platinum-olefin complexes is particularly preferred.

The term "platinum-vinylsiloxane complexes" as used herein generally refers to compounds containing a platinum atom and a siloxane, polysiloxane or cyclic siloxane having a vinyl group within the molecule as coordinated as a ligand to said platinum atom. As specific examples of the above ligand, there may be mentioned 1,1,3,3-tetramethyl-1,3-divinyldisiloxane, 1,3,5,7-tetramethyl-1,3,5,7-tetravinylcyclotetrasiloxane and the like. As specific examples of the olefin ligand in the platinum-olefin complexes, there may be mentioned 1,5-hexadiene, 1,7-octadiene, 1,9-decadiene, 1,11-dodecadiene, 1,5-cyclooctadiene and the like. Among the above ligands, 1,9-decadiene is particularly preferred. The platinum-olefin complexes are disclosed in Japanese Kokoku Publication Hei-08-9006.

While the amount of the catalyst is not particularly restricted, it is generally preferred that the platinum catalyst be used in an amount of $10^{-1}$ to $10^{-8}$ mole, more preferably $10^{-3}$ to $10^{-6}$ mole, per mole of the alkenyl group. When the catalyst amount is insufficient, the hydrosilylation reaction may not proceed to a satisfactory extent. When the catalyst amount is excessive, problems arise such as an increased burden of cost due to catalyst consumption and an increased residual catalyst content in products.

The hydrosilylation reaction in the production of the reactive silicon group-containing polyether oligomer (I) is judiciously carried out at a temperature generally within the range of 10 to 150° C., preferably 20 to 120° C., more preferably 40 to 100° C.

In the above hydrosilylation reaction, a solvent such as benzene, toluene, xylene, tetrahydrofuran, methylene chloride, pentane, hexane or heptane can be used if necessary for adjusting the reaction temperature and/or reaction system viscosity, for instance. Particularly when a high-molecular-weight compound is subjected to hydrosilylation, the use of a solvent is favorable for making the reaction system liquid or reducing the viscosity. The plasticizer to be added in producing a final preparation using the high-molecular-weight compound may also be used as the solvent.

In carrying out the above hydrosilylation reaction, the gaseous phase in the reaction vessel may comprise an inert gas, such as nitrogen or helium, alone or may contain oxygen, for instance. In certain instances, the hydrosilylation reaction is carried out in the presence of an inert gas such as nitrogen or helium in the gaseous phase in the reaction vessel from the viewpoint of safety in handling combustible materials. When, however, the reaction is carried out in the presence of an inert gas such as nitrogen or helium in the gaseous phase in the reaction vessel, the reaction rate may lower in some instances according to the hydrosilylation reaction conditions.

In the above hydrosilylation reaction, it is possible, by selecting an oxygen concentration in the gaseous phase in the reaction vessel which can avoid the explosive mixture composition region, to promote the hydrosilylation reaction safely in the presence of oxygen. The oxygen concentration in the gaseous phase in the reaction vessel can amount to 0.5 to 10%, for instance.

Further, for preventing the polyether oligomer, reaction solvent and plasticizer in the system, among others, from being oxidized in the hydrosilylation reaction, the hydrosilylation reaction may be carried out in the presence of an antioxidant. Usable as the antioxidant are phenolic antioxidants having a radical chain inhibitor function, such as 2,6-di-tert-butyl-p-cresol, 2,6-di-tert-butylphenol, 2,4-dimethyl-6-tert-butylphenol, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis[methylene-3-(3,5-di-tert-butyl-4-hydroxyphenyl) propionate]methane, 1,1,3-tris(2-methyl-4-hydroxy-5-tert-butylphenyl)butane and the like. Similar radical chain inhibitors which can be used include, but are not limited to, amine type antioxidants such as phenyl-β-naphthylamine, α-naphthylamine, N,N'-di-sec-butyl-p-phenylenediamine, phenothiazine, N,N'-diphenyl-p-phenylenediamine and the like.

From the viewpoint of promotion of the hydrosilylation reaction, catalyst reactivation using oxygen (Japanese Kokai Publication Hei-08-283339) or addition of sulfur is preferred. The addition of sulfur makes it possible to curtail the production time and further contributes to productivity improvement, without raising such problems as an increase in production cost due to the use of an increased amount of a platinum catalyst, which is expensive, and/or necessity of residual catalyst removal.

The sulfur compound to be used includes, but is not limited to, elemental sulfur, thiols, sulfides, sulfoxides, sulfones, thioketones and the like. Sulfur is especially preferred, however. For adding such sulfur compound to the liquid reaction system, it is possible to dissolve and mix the sulfur compound in and with a portion of the reaction mixture or solvent and then disperse the solution homogeneously into the whole reaction mixture. For instance, the sulfur compound can be added to the system following dissolution in an organic solvent such as toluene, hexane or xylene.

The addition amount of the sulfur compound can be selected, for example, within the range of 0.1 to 10 times the number of moles of the metal catalyst, or $10^{-3}$ to $10^{-6}$ times the number of moles of the alkenyl group, or 0.001 to 10 ppm based on the total weight of the reaction mixture. When the addition amount is low, the effect of the addition of sulfur may not be produced to a satisfactory extent. When it is excessive, the sulfur compound may reduce the catalytic activity or inhibit the reaction. For avoiding such problems, the addition amount should adequately be selected.

The reactive silicon group-containing polyether oligomer (I) obtainable in the above manner maybe used as a single species or two or more species thereof may be used in combination in the curable composition of the present invention.

A modification of the reactive silicon group-containing polyether oligomer may be used as the component (I). Typical modifications are obtained by polymerizing a mixture of an acrylate ester monomer and/or methacrylate ester monomer which have (has) an alkyl group containing 1 to 8 carbon atoms and are(is) represented by the general formula (10):

$$CH_2=C(R^5)(COOR^6) \quad (10)$$

wherein $R^5$ represents a hydrogen atom or a methyl group and $R^6$ represents an alkyl group containing 1 to 8 carbon atoms, and an acrylate ester monomer and/or methacrylate ester monomer which have (has) an alkyl group containing not less than 10 carbon atoms and are (is) represented by the general formula (11):

$$CH_2=C(R^5)(COOR^7) \quad (11)$$

wherein $R^5$ is as defined above and $R^7$ represents an alkyl group containing not less than 10 carbon atoms, in the presence of the reactive silicon group-containing polyether oligomer.

The use of such a modification results in an improvement in weathering resistance of the cured products resulting from the curable composition.

In the above general formula (10), $R^6$ includes alkyl groups containing 1 to 8 carbon atoms, such as methyl, ethyl, propyl, n-butyl, tert-butyl and 2-ethylhexyl, among which alkyl groups containing 1 to 4 carbon atoms are preferred and alkyl groups containing 1 to 2 carbon atoms are more preferred. The monomer represented by general formula (10) may comprise a single species or a combination of two or more species.

In the above general formula (11), $R^7$ includes long-chain alkyl groups containing not less than 10 carbon atoms, generally 10 to 30 carbon atoms, preferably 10 to 20 carbon atoms, such as lauryl, tridecyl, cetyl, stearyl, biphenyl and the like. The monomer represented by general formula (11) may comprise a single species or a combination of two or more species.

The mixing ratio between the monomer of formula (10) and the monomer of formula (11) is preferably 95:5 to 40:60 by weight, more preferably 90:10 to 60:40 by weight.

In this polymerization, a further monomer other than the monomers of formulas (10) and (11) may be used combinedly. As such monomer, there may be mentioned acrylic acids such as acrylic acid and methacrylic acid, amide group-containing monomers such as acrylamide, methacrylamide, N-methylolacrylamide and N-methylolmethacrylamide, epoxy group-containing monomers such as glycidyl acrylate and glycidyl methacrylate, amino group-containing monomers such as diethylaminoethyl acrylate, diethylaminoethyl methacrylate and aminoethyl vinyl ether, acrylonitrile, styrene, α-methylstyrene, alkyl vinyl ethers, vinyl chloride, vinyl acetate, vinyl propionate, ethylene and like monomers. In this case, it is preferred that the sum total of the monomers of formulas (10) and (11) polymerized account for not less than 50% by weight, in particular not less than 70% by weight of all the monomers polymerized.

The component (II) plasticizer in the curable composition of the present invention, which is to be selected and used according to the intended purpose, such physical properties modification or appearance modification, includes phthalate esters such as dibutyl phthalate, diheptyl phthalate, di(2-ethylhexyl) phthalate, butyl benzyl phthalate and butyl phthalylbutyl glycolate; nonaromatic dibasic acid esters such as dioctyl adipate and dioctyl sebacate; polyalkylene glycol esters such as diethylene glycol dibenzoate and triethylene glycol dibenzoate; phosphate esters such as tricresyl phosphate and tributyl phosphate; chlorinated paraffins; hydrocarbon oils such as alkyldiphenyl and partially hydrogenated terphenyl; high-molecular plasticizers; and high-viscosity plasticizers, among others. The use of a high-molecular plasticizer and/or high-viscosity plasticizer is preferred, however.

Such high-molecular plasticizer specifically includes, but is not limited to, polyester plasticizers such as polyesters from dibasic acids and dihydric alcohols; polyethers such as polypropylene glycol and derivatives thereof; polystyrenes such as poly-α-methylstyrene and polystyrene; polybutadiene, butadiene-acrylonitrile copolymers, polychloroprene, polyisoprene, polybutene and hydrogenated polybutene, among others. Among these, polyester plasticizers, polyethers, polystyrenes, polybutadiene, polybutene and the like are preferred since they show good compatibility with the polyether oligomer (A) and reduce the viscosity of the composition, hence are excellent in workability, among others. The high-molecular plasticizer preferably has a number average molecular weight of 500 to 25,000, more preferably 700 to 20,000, most preferably 4,000 to 15,000.

The above polyethers, among others, are excellent in compatibility with the polyether oligomer (A) and in viscosity reducing effect and are more preferred also in view of their capability to provide cured products with a low elasticity modulus and high elongation, among others. Among the above polyethers, those having a number average molecular weight of not less than 4,500, preferably 5,000 to 15,000, are particularly preferred.

Further, those having a small number of molecular terminals or those having a small number of hydrogen atoms at molecular terminals are preferred because of their improving the drying behavior of alkyd-based coating compositions applied. Those having substantially no hydroxy group at a molecular terminal are more preferred. For the same reasons, those having a terminal alkyl ether, allyl ether, aryl ether or like group are preferred.

Such polyethers specifically include, but are not limited to, polyoxypropylene glycols having a number average molecular weight of not less than 4,000 with a narrow molecular weight distribution or with a low content of molecules having a molecular weight of not more than 1,000, modifications thereof as produced by blocking one terminal hydroxy group, preferably both terminal hydroxy groups of such polyoxypropylene glycols by means of alkyl ether bonding, alkylphenyl ether bonding, alkenyl ether bonding, allyl ether bonding or the like or by blocking the hydroxy group(s) with an alkyl, aryl, alkenyl or some other group via a urethane, ester, urea, amide, carbonate or like bond.

The molecular weight and other characteristics of the high-viscosity plasticizer are not particularly restricted provided that said plasticizer has a viscosity at 25° C. of not less than about 0.8 Pa·s, preferably about 2 to 30 Pa·s. Generally, however, the viscosity increases with the increase of molecular weight and, therefore, many of high-molecular plasticizers generally serve as high-viscosity plasticizers. Specific examples of high-viscosity plasticizers other than high-molecular plasticizers include, but are not limited to, triaryldiethanes, isomer mixtures thereof, 1-phenyl-1-xylylethane and chlorinated paraffins, among others.

In the practice of the present invention, a plasticizer having a viscosity at 25° C. of not less than 2 Pa·s as selected from the group consisting of triaryldiethanes, isomer mixtures thereof and 1-phenyl-1-xylylethane may be used as a plasticizer other than the specific high-molecular plasticizers. Among them, triaryldiethanes and isomer mixtures thereof, for instance, are preferred.

The plasticizers mentioned above may be used singly or two or more of them may be used in combination. The plasticizers may be incorporated in the solvent, for instance, in the step of production of the polyether oligomer (I).

As defined hereinabove, the above plasticizer is used in an amount of 1 to 500 parts by weight, preferably 10 to 450 parts by weight, most preferably 50 to 400 parts by weight, per 100 parts by weight of the polyether oligomer (I). When the amount is less than 1 part by weight, the effect to be produced by the use of the plasticizer will be no more produced. When it exceeds 500 parts by weight, such problems may possibly arise as insufficient mechanical strength of the cured products and staining by exudation of the plasticizer.

The curable composition of the present invention, if necessary supplemented with one or more additives selected from among reinforcing or nonreinforcing fillers such as white carbon, carbon black, calcium carbonate, titanium oxide, talc, asbestos, glass fiber and the like, antioxidants, ultraviolet absorbers, pigments, fire retardants, can effectively be used as an adhesive or pressure sensitive adhesive, coating composition, sealing composition, waterproofing agent, spray composition, impression material or casting rubber material, for instance. The application thereof as a sealing composition, among others, is especially useful. When the curable composition of the present invention is used as a sealing composition, a filler, reinforcing agent, antisagging agent, colorant, antioxidant, tackifier, curing catalyst and/or physical property modifier, for instance, may be incorporated in said composition.

As for the filler and/or reinforcing agent, one or more selected from among ordinary ones such as ground and light calcium carbonate; calcium carbonate surface-treated with a fattyacid, resinacid, cationicsurfactant, anionicsurfactant or the like; magnesium carbonate; talc; titanium oxide; barium sulfate; alumina; metals in powder form such as aluminum, zinc and iron; bentonite; kaolin clay; fumed silica; quartz powder; carbon black and so forth may be used. In particular when a filler or reinforcing agent capable of providing transparency, such as fumed silica, is used, it is possible to produce a sealing material excellent in transparency.

As the antisagging agent, there may be mentioned hydrogenated castor oil derivatives; metal soaps such as calcium stearate, aluminum stearate and barium stearate; and the like. According to the purpose of use or the incorporation of a filler/reinforcing agent, no antisagging agent is required in certain instances.

Ordinary inorganic pigments, organic pigments and dyes may be used as the colorant if need be.

As for the physical property modifier, various silane coupling agents may be added according to need, for example alkylalkoxysilanes such as methyltrimethoxysilane, dimethyldimethoxysilane and n-propyltrimethoxysilane; alkylisopropenoxysilanes such as dimethyldiisopropenoxysilane, methyltriisopropenoxysilane and γ-glycidoxypropylmethyldiisopropenoxysilane; functional group-containing alkoxysilanes such as γ-glycidoxypropylmethyldimethoxysilane, γ-glycidoxypropyltrimethoxysilane, vinyltrimethoxysilane, γ-aminopropyltrimethoxysilane, N-(β-aminoethyl) aminopropylmethyldimethoxysilane, γ-mercaptopropyltrimethoxysilane and γ-mercaptopropylmethyldimethoxysilane; silicone varnishes; polysiloxanes and the like. By using the above physical property modifiers, it is possible to increase the hardness upon curing of the composition of the present invention or decrease the hardness and increase the elongation.

Since the polymer itself of the present invention has adhesiveness against glass, ceramics other than glass, and metals, among others, and since the use of one of various primers enables adhesion to a wide variety of materials, the use of a tackifier is not always necessary. By using one or more tackifiers selected from among epoxy resins, phenol resins, various silane coupling agents, alkyl titanates, aromatic polyisocyanates and the like, however, it is possible to improve the adhesiveness to a widened range of adherends.

Usable as the curing catalyst are titanate esters such as tetrabutyl titanate and tetrapropyl titanate; organotin compounds such as dibutyltin dilaurate, dibutyltin maleate, dibutyltin diacetate, stannous octoate and stannous naphthenate; lead octoate; amine compounds such as butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris(dimethyl-aminomethyl) phenol, morpholine, N-methylmorpholine and 1,3-diazabicyclo[5.4.6]undecene-7 (DBU), and carboxylic acid salts and other salts thereof; low-molecular-weight polyamide resins obtained from an excess of a polyamine and a polybasic acid; reaction products from an excess of a polyamine and an epoxy compound; and amino-containing silane coupling agents such as γ-aminopropyltrimethoxysilane and N-(β-aminoethyl) aminopropylmethyldimethoxysilane. One or more of these known silanol condensation catalysts may be used according to need.

A solvent may be incorporated for the purpose of improving the workability and reducing the viscosity, among others. The solvent includes, among others, aromatic hydrocarbon solvents such as toluene and xylene, ester solvents such as ethyl acetate, butyl acetate, amyl acetate and cellosolve acetate, and ketone solvents such as methyl ethyl ketone, methyl isobutyl ketone and diisobutyl ketone. Such solvents may be used in the step of polymer production.

While the antioxidant need not always be added, an ordinary antioxidant or ultraviolet absorber may be added.

Such curable composition may be prepared as a one-component formulation, which is curable upon exposure to moisture in the air after application, by preliminarily compounding all the components together and storing the formulation in a tightly sealed state. It may be prepared as a two-component formulation by separately compounding such components as the curing catalyst, filler, plasticizer and water to give a curing agent in advance. In this case, said curing agent(composition) is admixed with the polymer composition prior to use.

When the above curable composition is a one-component formulation, all the components are mixed up in advance and, therefore, those components which contain water are preferably used after preliminary dehydration/drying or are preferably dehydrated during mixing by kneading under reduced pressure, for instance.

In cases where the above curable composition is a two-component formulation, the curing catalyst need not be incorporated in the polymer-containing main composition, so that even when the curing agent contains water, there is no worry about gelation. Where long-term storage stability is required, however, dehydration/drying is recommended.

As for the method of dehydration/drying, drying by heating is judiciously employed for solid compositions such as powder form compositions whereas, for liquids, dehydration under reduced pressure or dehydration using synthetic zeolite, activated alumina, silica gel or the like can be employed. It is also possible to effect dehydration by incorporating a small amount of an isocyanate compound to thereby cause the isocyanate group to react with water.

In addition to such dehydration/drying methods, the addition of a lower alcohol such as methanol or ethanol or an alkoxysilane compound such as n-propyltrimethoxysilane, vinylmethyldimethoxysilane, γ-mercaptopropylmethyldimethoxysilane, γ-mercaptopropylmethyldiethoxysilane or γ-glycidoxypropyltrimethoxysilane is conducive to a further improvement in storage stability.

The present invention has for its object to provide a curable composition capable of giving cured products improved in residual tack (stickiness) within that range of physical properties where those tensile characteristics and rubber elasticity, required of a sealing composition for general architectural use, are retained. Said range of physical properties where those tensile characteristics and rubber elasticity, required of a sealing composition for general architectural use, are retained is preferably reflected by the modulus at 50% elongation of the cured product falling within the range of 0.05 MPa≦M50≦0.30 MPa.

When the modulus at 50% elongation of the cured product is less than 0.05 MPa, follow-up displacement may occur in response to even a small displacement of a constituent member in certain instances. This is unfavorable from the viewpoint of member fixation. When the modulus at 50% elongation of the cured product is in excess of 0.30 MPa, the follow-up action responsive to the displacement of a member tends to be poor, hence failure (peeling off of the sealing material) tends to occur on the interface between the member and the sealing material. This is also unfavorable.

The modulus at 50% elongation of a cured product as so referred to herein is defined as the tensile strength at 50% elongation as found by curing the final curable composition, prepared by adding a filler, reinforcing agent, antisagging agent, colorant, antioxidant, light stabilizer, tackifier, curing catalyst, physical propertymodifier, surface modifier, dehydrating agent and/or the like to a curable composition composed of (I) a reactive silicon group-containing polyether oligomer and (II) a plasticizer according to need, at a temperature of 23° C. and a humidity of 55% for 3 days and further at 50° C. for 4 days to give a cured product sheet having a thickness of about 3 mm, then punching the thus-prepared cured product sheet to give No. 3 dumbbell test specimens according to JIS K 6301 and subjecting the test specimens to tensile testing (rate of pulling: 200 mm/min).

BEST MODE FOR CURRYING OUT THE INVENTION

The following examples further illustrate the present invention. They are, however, by no means limitative of the scope of the present invention.

Synthesis Example 1

A hydroxy-terminated polyether oligomer with a number average molecular weight of 10,000 was prepared by polymerizing propylene oxide using polypropylene glycol as an initiator and zinc hexacyanocobaltate-glyme complex as a catalyst. A methanol solution containing 1.2 equivalents, relative to the hydroxy groups of the hydroxy-terminated polyether oligomer, of NaOMe was then added, the methanol was distilled off, and 3-chloro-2-methyl-1-propene was further added to convert the terminal hydroxy groups to methallyl groups. To 500 g of the oligomer obtained after treatment for desalting and purification were added 2,6-di-tert-butyl-p-cresol as an antioxidant and hexane as a solvent for azeotropic distillation, and dehydration was effected azeotropically at 90° C. The hexane was distilled off under reduced pressure, and the vessel atmosphere was then substituted with 8% $O_2/N_2$. To the vessel were added 25 $\mu u$ 1 of a 1% by weight solution of sulfur in toluene and 56 $\mu l$ of a 3% by weight (as platinum) platinum divinyldisiloxane complex solution in xylene. Then, 24.2 g of DMS (dimethoxymethylsilane) was slowly added dropwise with stirring. The reaction was allowed to proceed at 90° C. for 5 hours and the unreacted portion of DMS was distilled off under reduced pressure to give a reactive silicon group-containing polyoxypropylene polymer. $^1$H-NMR analysis of the polymer obtained revealed that the terminal reactive silicon group introduction percentage was 98% (polymer A).

Synthesis Example 2

A hydroxy-terminated polyether oligomer with a number average molecular weight of 10,000 was prepared by polymerizing propylene oxide using polypropylene glycol as an initiator and zinc hexacyanocobaltate-glyme complex as a catalyst. A methanol solution containing 1.2 equivalents, relative to the hydroxy groups of the hydroxy-terminated polyether oligomer, of NaOMe was then added, the methanol was distilled off, and 3-chloro-1-propene was further added to convert the terminal hydroxy groups to allyl groups. To 2,000 g of the oligomer obtained were added 2,6-di-tert-butyl-p-cresol as an antioxidant and hexane as a solvent for azeotropic distillation, and dehydration was effected azeotropically at 90° C. The hexane was distilled off under reduced pressure, and the vessel atmosphere was then substituted with nitrogen. To the vessel was added 160 $\mu l$ of a 5% by weight hexachloroplatinic acid catalyst solution in isopropanol. Then, 26.28 g of DMS (dimethoxymethylsilane) was slowly added dropwise with stirring. The reaction mixture was heated at 90° C. for 2 hours and the unreacted portion of DMS was then distilled off under reduced pressure to give a reactive silicon group-containing polyoxypropylene polymer. $^1$H-NMR analysis of the polymer obtained revealed that the terminal reactive silicon group introduction percentage was 55% (polymer B).

Synthesis Example 3

A hydroxy-terminated polyether oligomer with a number average molecular weight of 10,000 was prepared by polymerizing propylene oxide using polypropylene glycol as an initiator and zinc hexacyanocobaltate-glyme complex as a catalyst. A methanol solution containing 1.2 equivalents, relative to the hydroxy groups of the hydroxy-terminated polyether oligomer, of NaOMe was then added, the methanol was distilled off, and 3-chloro-1-propene was further added to convert the terminal hydroxy groups to allyl groups. To 500 g of the oligomer obtained were added 2,6-di-tert-butyl-p-cresol as an antioxidant and hexane as a solvent for azeotropic distillation, and dehydration was effected azeotropically at 90° C. The hexane was distilled off under reduced pressure, and the vessel atmosphere was then substituted with nitrogen. To the vessel was added 40 $\mu l$ of a 5% by weight hexachloroplatinic acid catalyst solution in isopropanol. Then, 7.7 g of DMS (dimethoxymethylsilane) was slowly added dropwise with stirring. The reaction mixture was heated at 90° C. for 2 hours and the unreacted portion of DMS was then distilled off under reduced pressure to give a reactive silicon group-containing polyoxypropylene polymer. $^1$H-NMR analysis of the polymer obtained revealed that the terminal reactive silicon group introduction percentage was 62% (polymer C).

EXAMPLE 1

Using 50 parts by weight of polymer A, a curable composition was prepared according to the formulation shown in Table 1 (the amount of each component being given in terms of parts by weight) and the composition was tested by the methods mentioned below.

EXAMPLE 2

The procedure of Example 1 was followed in the same manner except that a curable composition was prepared according to the formulation shown in Table 1 using 40 parts of polymer A.

EXAMPLE 3

The procedure of Example 1 was followed in the same manner except that a curable composition was prepared according to the formulation shown in Table 1 using 30 parts of polymer A.

EXAMPLE 4

The procedure of Example 1 was followed in the same manner except that a curable composition was prepared according to the formulation shown in Table 1 using 40 parts of polymer A.

Comparative Example 1

The procedure of Example 1 was followed in the same manner except that 100 parts of polymer B was used.

Comparative Example 2

The procedure of Example 1 was followed in the same manner except that 100 parts of polymer C was used.

TABLE 1

Formulations of the curing compositions

| | | Example | | | | Compar. Ex. | |
|---|---|---|---|---|---|---|---|
| | | 1 | 2 | 3 | 4 | 1 | 2 |
| Polymer A | | 50 | 40 | 30 | 40 | — | — |
| Polymer B | | — | — | — | — | 100 | — |
| Polymer C | | — | — | — | — | — | 100 |
| Ground calcium carbonate | Hakuenka CCR[1] | 120 | 120 | 120 | 120 | 120 | 120 |
| Titanium oxide | R-820[2] | 20 | 20 | 20 | 20 | 20 | 20 |
| Plasticizer | PPG 3000[3] | 105 | 115 | 125 | 55 | 55 | 55 |
| | High-molecular plasticizer[4] | — | — | — | 60 | — | — |
| Thixotropy-improving agent | D-6500[5] | 2 | 2 | 2 | 2 | 2 | 2 |
| Dehydrating agent | A-171[6] | 2 | 2 | 2 | 2 | 2 | 2 |
| Tackifier | A-1120[6] | 3 | 3 | 3 | 3 | 3 | 3 |
| Curing catalyst | U-220[7] | 2 | 2 | 2 | 2 | 2 | 2 |

[1]Produced by Shiraishi Kogyo
[2]Produced by Ishihara Kogyo
[3]Produced by TAKEDA CHEMICAL INDUSTRIES
[4]Methallyl polymer, precursor of Polymer A (number average molecular weight: 10000, viscosity; 6.0 Pa s),
[5]Produced by Kusumoto Kasei
[6]Produced by Nippon Unicar
[7]Produced by Nitto Kasei (1) Tensile Characteristics of Cured Products The curable composition was cured (23° C.×3 days+50° C.×4 days) to a thickness of 3 mm, and No. 3 dumbbell test specimens according to JIS K 6301 were punched out of the cured sheet and subjected to tensile testing at a rate of pulling of 200 mm/min.

(2) Residual Tack

The curable composition was packed in anointment can (4.5 mm in depth, 46 mm in diameter) and cured at 23° C. and 55% humidity and the degree of stickiness of the surface of the curable composition was evaluated by touching with a finger. Eight step evaluation was made as follows: (good) >⊚, ⊚, ○~⊚, ○, ○△, △, △×, × (bad).

The results obtained are shown in Table 2.

TABLE 2

Results of curable compositions

| | | | Example | | | | Compar. Ex. | |
|---|---|---|---|---|---|---|---|---|
| | | | 1 | 2 | 3 | 4 | 1 | 2 |
| Dumbbell | M50 | MPa | 0.24 | 0.16 | 0.09 | 0.18 | 0.09 | 0.18 |
| Tensile | M100 | MPa | 0.45 | 0.32 | 0.18 | 0.34 | 0.18 | 0.34 |
| property | TB | MPa | 1.70 | 1.40 | 0.84 | 1.05 | 0.96 | 1.44 |
| | EB | % | 540 | 560 | 490 | 420 | 660 | 580 |
| Residual | after 1 day | | ⊚ | ○~⊚ | ○ | ○~⊚ | ○△ | ○ |
| tack | after 3 day | | >⊚ | ○~⊚ | ○ | ⊚ | ○△ | ○ |
| | after 7 day | | >⊚ | ⊚ | ○~⊚ | ⊚ | ○△ | ○~⊚ |

The composition of Example 3 was superior in residual tack to that of Comparative Example 1 although they gave the same modulus value. The same may be said when Example 4 is compared with Comparative Example 2. Furthermore, the composition of Example 2 was superior in residual tack to that of Comparative Example 2 in spite of the fact that the modulus in Example 2 was smaller than that in Comparative Example 2.

EFFECTS OF THE INVENTION

The curable composition of the present invention can give cured products improved in residual tack and reduced in stickiness within that range of physical properties where those tensile characteristics and rubber elasticity, required of a sealing composition for general architectural use, are retained.

What is claimed is:

1. A curable composition which comprises (I) 100 parts by weight of a reactive silicon group-containing polyether polymer in which not less than 90% of the number of molecular chain terminals have the reactive silicon groups as determined by $^1$H-NMR analysis and (II) 210 to 420 parts by weight of a plasticizer.

2. The curable composition according to claim 1, wherein the cured product has a modulus at 50% elongation of 0.05 MPa≦M50≦0.30 MPa.

3. The curable composition according to claim 1 wherein the reactive silicon group occurs at a molecular chain terminal of the reactive silicon group-containing polyether polymer (I).

4. The curable composition according to claim 1, wherein the reactive silicon group is represented by the general formula (1):

$$—(Si(R^1{}_{2-b})(X_b)O)_m Si(R^2{}_{3-a})X_a \quad (1)$$

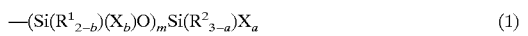

wherein $R^1$ and $R^2$ are the same or different and each represents an alkyl group containing 1 to 20 carbon atoms, an aryl group containing 6 to 20 carbon atoms, an aralkyl group containing 7 to 20 carbon atoms or a triorganosiloxy group of the formula $(R')_3SiO—$, in which the three R' groups are the same or different and each is a monovalent hydrocarbon group containing 1 to 20 carbon atoms, and, when there are two or more $R^1$ or $R^2$ groups, they may be the same or different; X represents a hydroxyl group or a hydrolyzable group and, when there are two or more X groups, they may be the same or different; a represents 0, 1, 2 or 3, b represents 0, 1 or 2 and $—Si(R^1{}_{2-b})(X_b)—O—$ may be the same or different from each other when m is 2 or more; m represents an integer of 0 to 19; with the condition that the relation of $a+\Sigma b \geq 1$ is satisfied.

5. The curable composition according to claim 1, wherein said reactive silyl-containing polyether polymer (I) is derived from a polyether polymer obtainable by ring opening addition polymerization of an alkylene oxide in the presence of double metal cyanide complex catalyst.

6. The curable composition according to claim 1, wherein the main chain of said reactive silyl-containing polyether polymer (I) is formed mainly from propylene oxide.

7. The curable composition according to claim 1, wherein the reactive silicon group-containing polyether polymer (I) is obtainable by reacting (a) a polyether polymer with (b) a reactive silicon group-containing compound in the presence of (c) a group VIII transition metal catalyst, said polyether polymer comprising a polyether as its main chain and, on a side chain or at a terminal, at least one unsaturated group represented by the general formula (2):

$$H_2C=C(R^3)—R^4—O— \quad (2)$$

wherein $R^3$ is a hydrocarbon group containing not more than 10 carbon atoms and $R^4$ is a divalent organic group containing 1 to 20 carbon atoms and one or more constituent atoms selected from the group consisting of hydrogen, oxygen and nitrogen atoms, or by the general formula (3):

$$HC(R^3)=CH—R^4—O— \quad (3)$$

wherein $R^3$ is a hydrocarbon group containing not more than 10 carbon atoms and $R^4$ is a divalent organic group containing 1 to 20 carbon atoms and one or more constituent atoms selected from the group consisting of hydrogen, oxygen and nitrogen atoms.

8. The curable composition according to claim 7, wherein the group VIII transition metal catalyst (c) comprises at least one member selected from the group consisting of platinum-vinylsiloxane complexes and platinum-olefin complexes.

9. The curable composition according to claim 7, wherein, in general formulas (2) and (3), $R^3$ is $CH_3$ or $CH_2CH_3$.

10. The curable composition according to claim 9, wherein the unsaturated group of general formula (2) is represented by the general formula (4):

$$H_2C=C(CH_3)—CH_2—O— \quad (4).$$

11. The curable composition according to claim 9, wherein the unsaturated group of general formula (3) is represented by the general formula (5):

$$(CH_3)CH=CH—CH_2—O— \quad (5).$$

12. The curable composition according to claim 1, wherein the plasticizer (II) comprises a high-molecular plasticizer and/or a high-viscosity plasticizer.

13. The curable composition according to claim 2,
wherein the reactive silicon group occurs at a molecular chain terminal of the reactive silicon group-containing polyether polymer (I).

14. The curable composition according to claim 2,
wherein the reactive silicon group is represented by the general formula (1):

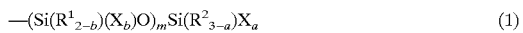

wherein $R^1$ and $R^2$ are the same or different and each represents an alkyl group containing 1 to 20 carbon atoms, an aryl group containing 6 to 20 carbon atoms, an aralkyl group containing 7 to 20 carbon atoms or a triorganosiloxy group of the formula $(R')_3SiO-$, in which the three R' groups are the same or different and each is a monovalent hydrocarbon group containing 1 to 20 carbon atoms and, when there are two or more $R^1$ or $R^2$ groups, they may be the same or different; X represents a hydroxyl group or a hydrolyzable group and, when there are two or more X groups, they may be the same or different; a represents 0, 1, 2 or 3, b represents 0, 1 or 2 and $-Si(R^1{}_{2-b})(X_b)-O-$ may be the same or different from each other when m is 2 or more; m represents an integer of 0 to 19; with the condition that the relation of $a+\Sigma b \geq 1$ is satisfied.

15. The curable composition according to claim 3,
wherein the reactive silicon group is represented by the general formula (1):

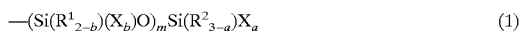

wherein $R^1$ and $R^2$ are the same or different and each represents an alkyl group containing 1 to 20 carbon atoms, an aryl group containing 6 to 20 carbon atoms, an aralkyl group containing 7 to 20 carbon atoms or a triorganosiloxy group of the formula $(R')_3SiO-$, in which the three R' groups are the same or different and each is a monovalent hydrocarbon group containing 1 to 20 carbon atoms and, when there are two or more $R^1$ or $R^2$ groups, they may be the same or different; X represents a hydroxyl group or a hydrolyzable group and, when there are two or more X groups, they may be the same or different; a represents 0, 1, 2 or 3, b represents 0, 1 or 2 and $-Si(R^1{}_{2-b})(X_b)-O-$ may be the same or different from each other when m is 2 or more; m represents an integer of 0 to 19; with the condition that the relation of $a+\Sigma b \geq 1$ is satisfied.

16. The curable composition according to claim 2,
wherein said reactive silyl-containing polyether polymer (I) is derived from a polyether polymer obtainable by ring opening addition polymerization of an alkylene oxide in the presence of double metal cyanide complex catalyst.

17. The curable composition according to claim 3,
wherein said reactive silyl-containing polyether polymer (I) is derived from a polyether polymer obtainable by ring opening addition polymerization of an alkylene oxide in the presence of double metal cyanide complex catalyst.

18. The curable composition according to claim 4,
wherein said reactive silyl-containing polyether polymer (I) is derived from a polyether polymer obtainable by ring opening addition polymerization of an alkylene oxide in the presence of double metal cyanide complex catalyst.

19. The curable composition according to claim 2,
wherein the main chain of said reactive silyl-containing polyether polymer (I) is formed mainly from propylene oxide.

20. The curable composition according to claim 3,
wherein the main chain of said reactive silyl-containing polyether polymer (I) is formed mainly from proplyene oxide.

21. The curable composition according to claim 1,
wherein the polymer (I) has the reactive silicon groups at not less than 95% of the number of molecular chain terminals as determined by $^1$H-NMR analysis.

22. The curable composition according to claim 1,
wherein the plasticizer (II) is a high-molecular plasticizer.

23. The curable composition according to claim 1,
wherein the polymer (I) has the reactive silicon groups at not less than 95% of the number of molecular chain terminals as determined by $^1$H-NMR analysis, and the plasticizer (II) is a high-molecular plasticizer.

24. The curable composition according to claim 1,
wherein the polymer (I) has the reactive silicon groups at not less than 98% of the number of molecular chain terminals as determined by $^1$H-NMR analysis.

25. The curable composition according to claim 1,
wherein the polymer (I) has the reactive silicon groups at not less than 98% of the number of molecular chain terminals as determined by $^1$H-NMR analysis, and the plasticizer (II) is a high-molecular plasticizer.

26. A curable composition which comprises (I) 100 parts by weight of a reactive silicon group-containing polyether polymer in which not less than 90% of the number of molecular chain terminals have the reactive silicon groups as determined by $^1$H NMR analysis and (II) 1 to 500 parts by weight of a plasticizer,
wherein the reactive silicon group-containing polyether polymer (I) is obtainable by reacting (a) a polyether polymer with (b) a reactive silicon group-containing compound in the presence of (c) a group VIII transition metal catalyst,
said polyether polymer comprising a polyether at its main chain and, on a side chain or at a terminal, at least one unsaturated group represented by the formula (3):

wherein $R^3$ is a hydrocarbon group containing not more than 10 carbon atoms and $R^4$ is a divalent organic group containing 1 to 20 carbon atoms and one or more constituent atoms selected from the group consisting of hydrogen, oxygen, and nitrogen atoms.

27. The curable composition according to claim 26
wherein in general formula (3), $R^3$ is $CH_3$ or $CH_2CH_3$.

28. The curable composition according to claim 26
wherein the at least one unsaturated group of general formula (3) is represented by the formula (5):

* * * * *

UNITED STATES PATENT AND TRADEMARK OFFICE
CERTIFICATE OF CORRECTION

PATENT NO. : 6,437,071 B1
DATED : August 20, 2002
INVENTOR(S) : Odaka et al.

It is certified that error appears in the above-identified patent and that said Letters Patent is hereby corrected as shown below:

Column 20,
Line 65, formula 5, change "$(CH_3)CH=CH-CH_2-O$" to -- $(CH_3)CH=CH-CH_2-O-$ --

Signed and Sealed this

Thirteenth Day of May, 2003

JAMES E. ROGAN
*Director of the United States Patent and Trademark Office*